US011536555B2

(12) United States Patent
Scheller et al.

(10) Patent No.: US 11,536,555 B2
(45) Date of Patent: Dec. 27, 2022

(54) SCANNING SELF-MIXING INTERFEROMETRY SYSTEM AND SENSOR

(71) Applicant: Meta Platforms Technologies, LLC, Menlo Park, CA (US)

(72) Inventors: Maik Andre Scheller, Redmond, WA (US); Liliana Ruiz Diaz, Redmond, WA (US); Marc Aurele Gilles, Redmond, WA (US); Andrew John Ouderkirk, Redmond, WA (US); Robert Dale Cavin, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/167,005

(22) Filed: Feb. 3, 2021

(65) Prior Publication Data
US 2022/0244036 A1  Aug. 4, 2022

(51) Int. Cl.
| G01B 9/02 | (2022.01) |
| G02B 27/01 | (2006.01) |
| G01B 11/22 | (2006.01) |
| G01B 9/02097 | (2022.01) |
| G01B 9/02017 | (2022.01) |

(52) U.S. Cl.
CPC ..... *G01B 9/02092* (2013.01); *G01B 9/02019* (2013.01); *G01B 9/02049* (2013.01); *G01B 9/02097* (2013.01); *G01B 11/22* (2013.01); *G02B 27/0172* (2013.01); *G02B 2027/0178* (2013.01)

(58) Field of Classification Search
CPC ............ G01B 9/02092; G01B 9/02019; G01B 9/02049; G01B 9/02097; G01B 11/22; G02B 27/0172; G02B 2027/0178
See application file for complete search history.

(56) References Cited

U.S. PATENT DOCUMENTS

| 6,233,045 B1 * | 5/2001 | Suni ........................ G01P 3/366 |
| | | 356/5.1 |
| 2019/0372306 A1 * | 12/2019 | Reidy ................... H01S 5/0652 |
| 2020/0370879 A1 | 11/2020 | Mutlu et al. |
| 2021/0271320 A1 * | 9/2021 | Fiess .................. G02B 27/0172 |

FOREIGN PATENT DOCUMENTS

DE  102016226294 A1  7/2018

OTHER PUBLICATIONS

U.S. Appl. No. 16/918,229, filed unknown, Maik Andre Scheller.
U.S. Appl. No. 17/207,025, filed unknown, Maik Andre Scheller.
(Continued)

*Primary Examiner* — Jonathan M Hansen
(74) *Attorney, Agent, or Firm* — Freestone Intellectual Property Law PLLC; Aaron J. Visbeek

(57) ABSTRACT

Self-mixed interferometer (SMI) devices and techniques are described for measuring depth and/or velocity of objects. The SMI devices and techniques may be used for eye-tracking. A light source of an SMI sensor emits coherent light that is directed to a target location with a scanning module. One or more SMI signals are measured. The one or more SMI signals are generated by the SMI sensor in response to feedback light received from the target location. The feedback light is a portion of the coherent light that illuminated the target location.

16 Claims, 11 Drawing Sheets

(56) References Cited

OTHER PUBLICATIONS

International Search Report and Written Opinion for International Application No. PCT/US2022/014121, dated Apr. 28, 2022, 8 pages.
Yanguany, Yu; Yuanlong, Fan; Bin Liu, Self-Mixing interferometry and its application, 2016, 15 pages, vol. 10021, pp. 100210U-1-100210U-13, Optical Design and Testing VII, University of Wollongong Australia.

* cited by examiner

SCANNING SELF-MIXING INTERFEROMETRY SYSTEM AND SENSOR

TECHNICAL FIELD

This disclosure relates generally to optics and in particular to optical sensing.

BACKGROUND INFORMATION

A variety of electrical and optical sensors have been developed to measure proximity and/or distance. To increase sensor accuracy, an array of sensors may be used where the sensors in the array are positioned at different locations. Yet, increasing the number of sensors increases the processing and power costs of a product in addition to adding architecture complexity and increasing the required size and weight of the product.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
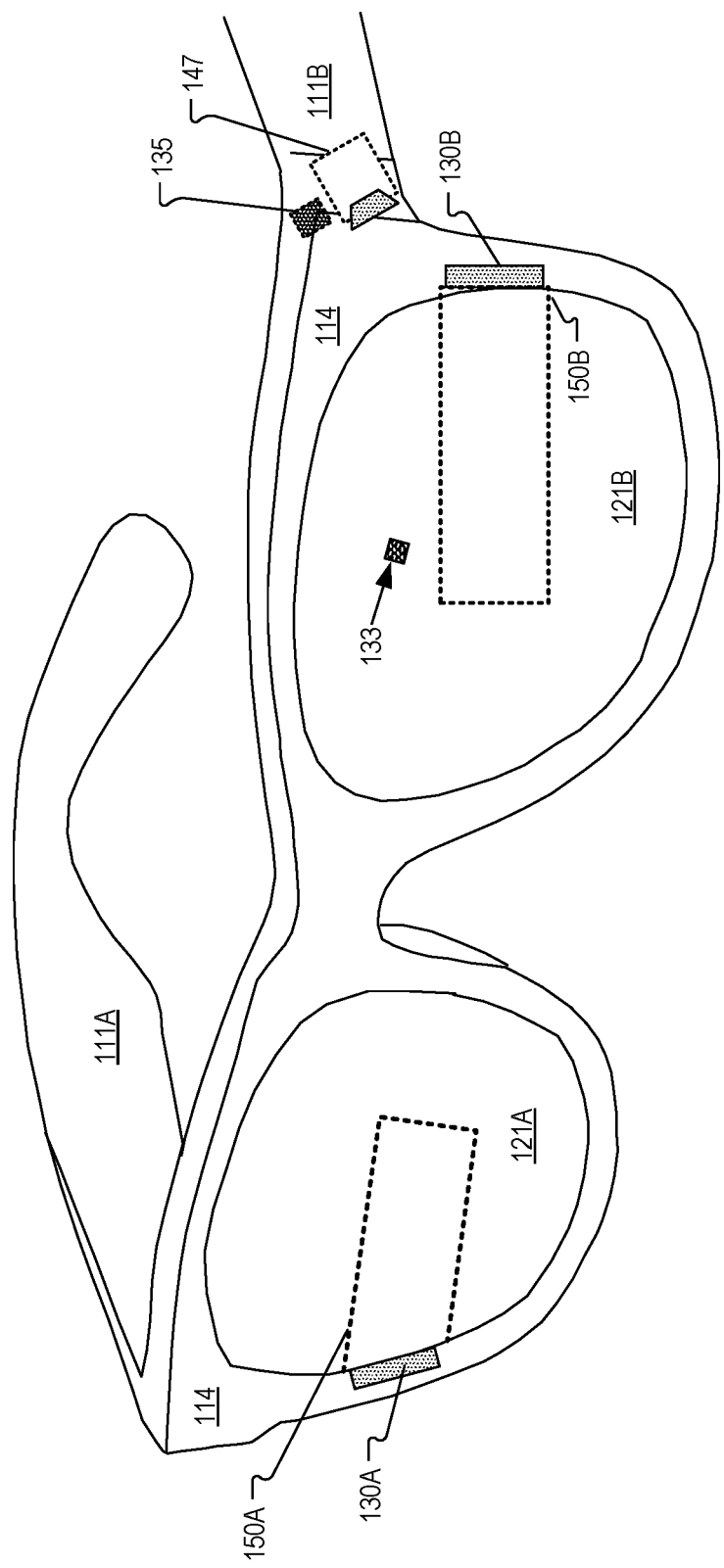
FIG. 1 illustrates an example head mounted device that includes a scanning module and a self-mixed interferometer (SMI), in accordance with aspects of the disclosure.

Embodiments of scanning self-mixing interferometry are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light has a wavelength range of approximately 700 nm-1 mm. Infrared light may include near-infrared light. In aspects of this disclosure, near-infrared light may be defined as having a wavelength range of approximately 700 nm-1.4 µm.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, the term "transparent" may be defined as having greater than 90% transmission of light. In some aspects, the term "transparent" may be defined as a material having greater than 90% transmission of visible light.

Self-Mixing Interferometry techniques include emitting coherent light from a light source (e.g. a laser) and generating an SMI signal in response to feedback light that is received by the optical cavity of the light source. Typically, a Self-Mixing Interferometer (SMI) includes a light source (e.g. a laser) and a light sensor (e.g. a photodiode) optically coupled to receive an optical signal from the optical cavity of the light source. While SMIs are used as sensors to sample depth and/or velocity measurements of a particular location, it may be advantageous to generate multiple samples over a plurality of locations. This may allow for better mapping of objects and increase the accuracy of the measurements. Yet, increasing the number of SMI sensors in a system generates increased architecture complexity and increases electrical power and processing costs.

Some contexts where one or more SMI sensors may be used may also be sensitive to weight and size requirements. In the particular context of head mounted devices, a plurality of SMI sensors may manifest as occlusions that negatively impact the field-of-view of a user of the head mounted device. Furthermore, the electrical routing to operate the plurality of SMI sensors may negatively impact the field-of-view of the user.

Embodiments of this disclosure include a sensing system, method, and device that use a scanning module (e.g. a micro-electro-mechanical systems scanner) paired with an SMI sensor to generate SMI signals for a plurality of points of an object. The scanning module may operate at a relatively high scanning frequency (e.g. 1 kHz or greater) to generate many SMI signals corresponding with the plurality of points of the object. The velocity and/or depth measurements calculated from the SMI signals provides better mapping of the objects and increased accuracy. One particular context for this sensing technique is eye-tracking in head mounted devices such as head mounted displays (HMDs). In this context, the disclosed sensing techniques don't necessarily require an external camera to image the eye for purposes of eye-tracking. In some contexts, the velocity and/or depth measurement generated from the SMI sensor is augmented with image data from an eye-tracking camera to generate eye data of an eye of a user of the head mounted device. Implementing the sensing systems, sensors, and/or methods of this disclosure increases sensing accuracy while reducing the complexity of hardware and software architectures compared to other solutions. These and other embodiments are described in more detail in connection with FIGS. 1-7.

FIG. 1 illustrates an example head mounted device 100 that includes a scanning module and a self-mixed interferometer (SMI), in accordance with an embodiment of the disclosure. Head mounted device 100 includes frame 114 coupled to arms 111A and 111B. Lenses 121A and 121B are mounted to frame 114. Lenses 121 may be prescription lenses matched to a particular wearer of head mounted device 100 or non-prescription lenses. The illustrated head mounted device 100 is configured to be worn on or about a head of a user of the head mounted device.

The frame 114 and arms 111 of the head mounted device 100 may include supporting hardware of head mounted device 100. Head mounted device 100 may be considered "electronic glasses" since head mounted device includes electronics. Head mounted device 100 may include any of processing logic, wired and/or wireless data interface for sending and receiving data, graphic processors, and one or more memories for storing data and computer-executable instructions. In one embodiment, head mounted device 100 may be configured to receive wired power. In one embodiment, head mounted device 100 is configured to be powered by one or more batteries. In one embodiment, head mounted device 100 may be configured to receive wired data including video data via a wired communication channel. In one embodiment, head mounted device 100 is configured to receive wireless data including video data via a wireless communication channel.

Head mounted device 100 may be a head mounted display (HMD) when head mounted device 100 is configured with a near-eye display for presenting images to the eye of a user. In FIG. 1, each lens 121 includes a waveguide 150 to direct display light generated by a display 130 to an eyebox area for viewing by a wearer of head mounted device 100. Display 130 may include an LCD, an organic light emitting diode (OLED) display, micro-LED display, quantum dot display, pico-projector, or liquid crystal on silicon (LCOS) display for directing display light to a wearer of head mounted device 100. Near-eye display architectures that are different from the example implementation illustrated in FIG. 1 may of course be used as alternatives, in some implementations.

Lenses 121 may appear transparent to a user to facilitate augmented reality or mixed reality where a user can view scene light from the environment around her while also receiving display light directed to her eye(s) by waveguide(s) 150. Consequently, lenses 121 may be considered (or include) an optical combiner. In some embodiments, display light is only directed into one eye of the wearer of head mounted device 100. In an embodiment, both displays 130A and 130B are included to direct display light into waveguides 150A and 150B, respectively.

The example head mounted device 100 of FIG. 1 includes a camera 147. Camera 147 may include a complementary metal-oxide semiconductor (CMOS) image sensor. An infrared filter that receives a narrow-band infrared wavelength may be placed over the image sensor so it is sensitive to the narrow-band infrared wavelength while rejecting visible light and wavelengths outside the narrow-band. Infrared illuminators (not illustrated) such as infrared LEDs or vertical-cavity surface-emitting lasers (VCSELs) that emit the narrow-band wavelength may be oriented to illuminate an eyebox area with the narrow-band infrared wavelength. In one embodiment, the infrared light is near-infrared light. In an implementation, the near-infrared light is centered around 850 nm. Camera 147 may be mounted on the inside of the temple of head mounted device 100. The images of the eye captured by camera 147 may be used for eye-tracking purposes, in some implementations. Camera 147 may directly image the eye or image the eye by way of an optical combiner (not illustrated) included in lens 121B that directs infrared light (reflected or scattered by the eye of the user) to camera 147.

The example head mounted device 100 of FIG. 1 includes an example in-field element 133 and an example out-of-field element 135. In-field element 133 will be in a field of view (FOV) of a user of head mounted device 100 since element 133 is included in lens 121B. Out-of-field element 135 will be out of the FOV of a user of head mounted device 100. The SMI sensors and systems of this disclosure may have an in-field element and/or an out-of-field element. While not specifically illustrated, SMI sensing hardware may also be associated with lens 121A. Although camera 147 and elements 133 and 135 are illustrated on only one side of head mounted device 100, they of course may be duplicated on the other side of head mounted device 100 (e.g. near lens 121A) to facilitate imaging of both eyes of a wearer of head mounted device 100.

Figure 2A:
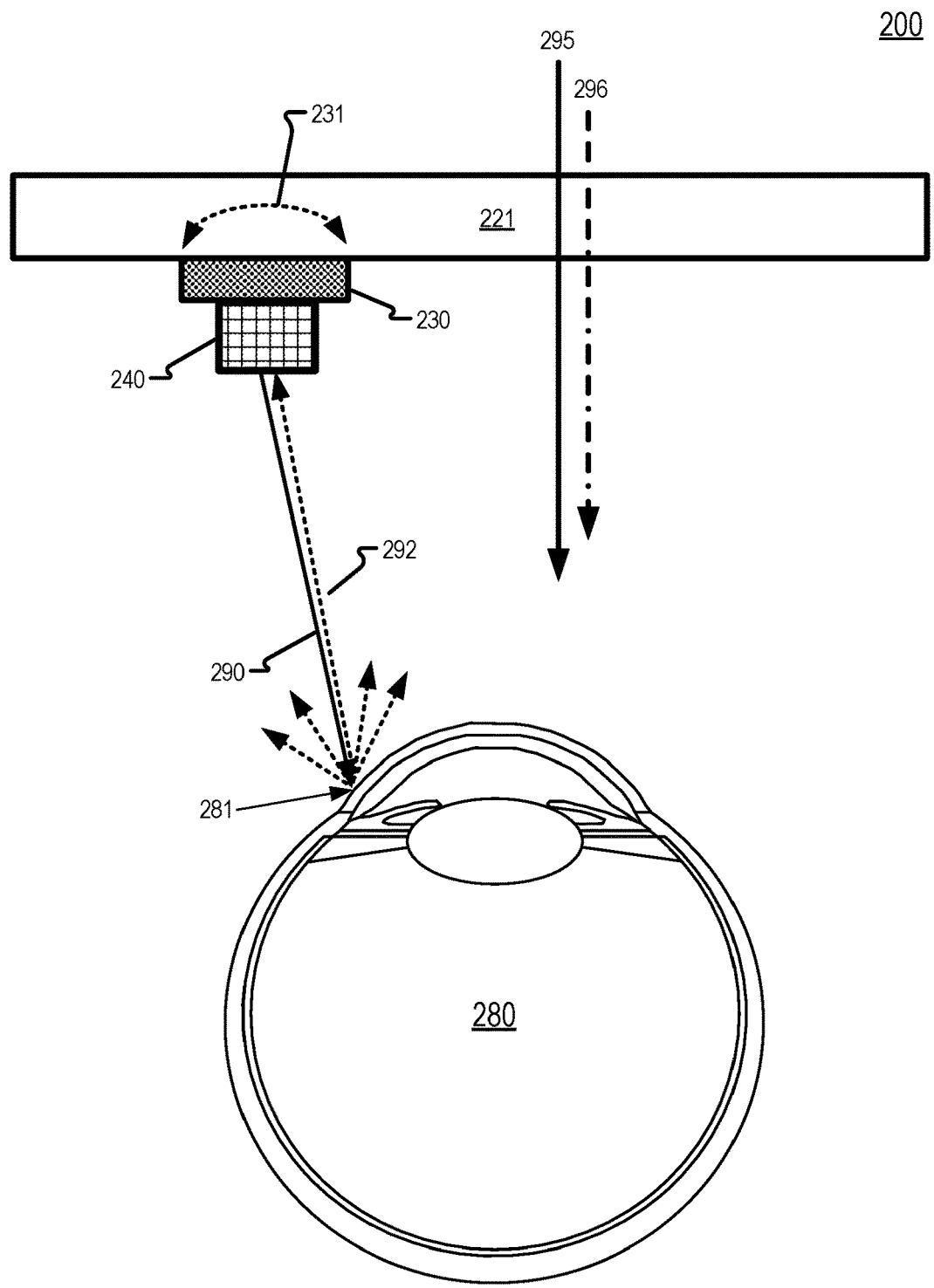
FIGS. 2A and 2B illustrate an example SMI implementation that includes an SMI sensor coupled with a scanning module, in accordance with aspects of the disclosure.

FIG. 2A illustrates an example SMI implementation 200 that includes an SMI sensor 240 coupled with a scanning module 230, in accordance with aspects of the disclosure. While SMI implementation 200 may be used in a variety of contexts, some example illustrations of the disclosure are illustrated in the context of near-eye sensing for eye-tracking of eye 280. SMI implementation 200 illustrates that scanning module 230 and SMI sensor 240 may be coupled with a transparent or semi-transparent optical element 221. Optical element 221 may be included in lenses 121 of FIG. 1, for example. Optical element 221 may pass (transmit) scene light 295 from an environment of a user of a head mounted device 100 to eye 280. FIG. 2A also illustrates that in implementations where a head mounted device is also an HMD, optical element 221 may pass display light 296 to eye 280 to present images included in display light 296 to the eye 280 of a user of an HMD.

Scanning module 230 may be a one-dimensional (1D) or two-dimensional (2D) scanning module that is able to tip and/or tilt along one or more axes 231. Scanning module 230 may include a microelectromechanical system (MEMS) scanner. Scanning module 230 may have a scan frequency of between 0.1 kHz to 50 kHz. The scan frequency of scanning module 230 may allow scanning module 230 to direct coherent light 290 to 120 or more eyebox locations per second, in some implementations. In an implementation, the scan frequency is 10 kHz. In an implementation, the scan frequency is 100 kHz. Scanning module 230 may include resonant scanner technology or quasi-static scanner technology. Scanning module 230 may utilize similar MEMS technology deployed in micro-mirror technologies for displays.

Scanning module 230 is coupled with SMI sensor 240. SMI sensor 240 may be bonded to the movable portion of scanning module 230 so the scanning module 230 is able to move SMI sensor 240 along the one or more axes 231, for example. SMI sensor 240 includes a light source (e.g. a near-infrared laser) and a light sensor (e.g. a photodiode). The light source may be an infrared light source emitting infrared light. The light source may be a near-infrared light source emitting near-infrared light. The light source emits coherent light. The light source may be a laser.

Figure 3:
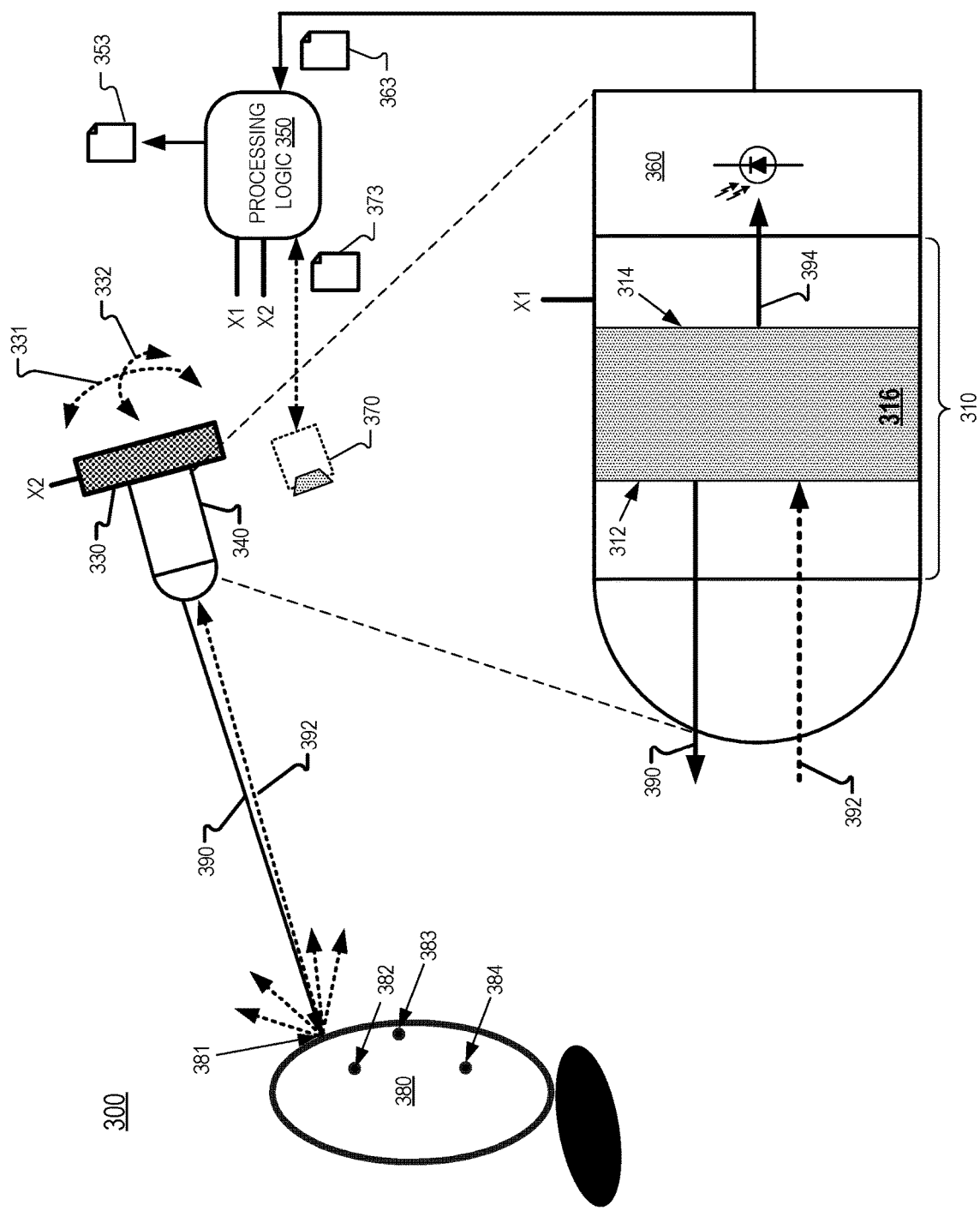
FIG. 3 illustrates an exploded view of an example SMI sensor, in accordance with aspects of the disclosure.

FIG. 3 illustrates an exploded view of an example SMI sensor 340 that may be used as SMI sensor 240, in accordance with aspects of the disclosure. FIG. 3 illustrates an SMI sensor 340 that is coupled with a scanning module 330 that moves SMI sensor 340. Scanning module 330 may include the features of scanning module 230. Scanning module 330 is configured to tip along axis 331 and tilt along axis 332 to provide 2D scanning functionality. The exploded view of SMI sensor 340 (indicated by diagonal dashed lines) shows that SMI sensor 340 includes a light source 310 and a light sensor 360. The example light sensor 360 is illustrated as a photodiode but light sensor 360 may be an alternative photosensor.

Light source 310 includes a cavity 316 (e.g. an optical cavity, which may be a laser cavity) defined by two reflective elements (e.g. reflective surfaces 312 and 314). In some embodiments, the reflective elements are distributed Bragg reflectors. In some embodiments, the light source 310 may be a laser source, such as a vertical cavity surface emitting laser (VCSEL) or a vertical external cavity surface emitting laser (VECSEL).

Optical cavity 316 is used to generate coherent light 390 and light source 310 is positioned to output at least a portion of the coherent light 390 towards object 380. Surface 312 is semi-reflective (e.g. surface 312 is a partially reflective and partially transmissive mirror). For example, the reflectance of the surface 314 is greater than the reflectance of the surface 312 (e.g. surface 314 has a reflectance of 100%, 99.99%, 99.9%, 99%, 98%, 97%, 96%, 95%, 90% or an interval between any two of the aforementioned values, and surface 312 has a reflectance of 99.99%, 99.9%, 99%, 98%, 97%, 96%, 95%, 90% or an interval between any two of the aforementioned values). In some configurations, surface 312 has a transmittance of at least 0.01%, 0.1%, 1%, or an interval between any two of the aforementioned values. Surface 312 reflects a portion of the light propagating toward the surface 312 within the cavity 316 back toward surface 314 and transmits a portion of the light propagating toward surface 312 within optical cavity 316 (e.g. surface 312 is configured to reflect at least a portion of the light generated inside the cavity 316 back into cavity 316 and to transmit at least a portion of the light generated inside the cavity 316). The transmitted light is emitted from light source 310 as coherent light 390. SMI sensor 340 (and hence, light source 310 of the SMI sensor 340) is configured to (e.g. positioned to) receive, via surface 312, at least a portion of the coherent light back from object 380 as feedback light 392. Object 380 reflects or scatters a portion of the incident coherent light 390 back to surface 312 as feedback light 392. Feedback light 392 may propagate along an optical path that is considered the reverse optical path of coherent light 390 that becomes incident onto a given target location. Feedback light 392 enters optical cavity 316 of light source 310 and interferes with the generation of the coherent light inside optical cavity 316, leading to a modulation of the intensity of the generated coherent light.

Modulated coherent light 394 (e.g. coherent light with modulated intensity) is output from the light source 310 (e.g. output from cavity 316) and at least a portion of the modulated coherent light 394 is received and detected by the light sensor 360. Light sensor 360 is configured to generate one or more SMI signals 363 based on the detected intensity (e.g. modulated intensity) of the modulated coherent light 394. Information regarding movement information of object 380 (e.g. movement of the pupil of an eye 280) can be determined by analyzing the modulated coherent light 394 or the one or more SMI signals 363 generated by light sensor 360. SMI signal 363 may be generated in response to an electrical current generated by a photodiode of light sensor 360 in response to modulated coherent light 394, for example.

This measurement technique is known as "self-mixing interferometry," where coherent light (e.g. a laser beam) is reflected from a target (e.g. a target object such as an eye) back into the light source (e.g. the laser cavity) and the reflected light interferes with, and modulates, the coherent light generated inside the light source (e.g. modulates the power and/or intensity of the light generated by the light source). Position and/or movement information regarding the target can be determined from (e.g. based on, using) intensity or power measurements of the modulated coherent light. The self-mixing interferometry is also called "feedback interferometry," "induced-modulation interferometry," and "backscatter modulation interferometry."

SMI sensor 340 (and hence, light source 310 of SMI sensor 340) is configured to (e.g. positioned to) output coherent light 390, via surface 312, towards an object 380. In some contexts of the disclosure, object 380 may be an eye or an eyebox area of a user of a head mounted device. SMI sensor 340 (and hence, light source 310 of the SMI sensor 340) is also configured to (e.g. positioned to) receive, via surface 312, at least a portion of the coherent light back from object 380 as feedback light 392. Object 380 reflects or scatters a portion of the incident coherent light 390 back to surface 312 as feedback light 392. Since the surface 314 is semi-reflective (e.g. a partially reflective and partially transmissive mirror), at least a portion of the coherent light generated inside the cavity 316 is output from the light source 310, via the surface 314, toward light sensor 360. Light sensor 360 is configured to (e.g. positioned to) receive (e.g. detect) at least a portion of the modulated coherent light 394 output from the light source 310 via the surface 314, and generate one or more SMI signals 363 based on the detected intensity (e.g. modulated intensity) of the modulated coherent light 394.

Example system 300 of FIG. 3 includes processing logic 350 configured to receive one or more SMI signals 363 from light sensor 360 of SMI sensor 340. System 300 may optionally include a camera 370 for capturing images of object 380. Camera 370 may include a CMOS image sensor and be positioned to image object 380. Processing logic 350 may be configured to receive image data 373 from camera 370 where image data 373 includes images of object 380. In some implementations where object 380 is an eye 280, image data 373 is eye image data and processing logic 350 is configured to receive the eye image data from camera 370. Processing logic 350 may then generate data 353 in response to receiving SMI signal 363 and eye image data 373. Therefore, image data 373 may be used to augment SMI signal 363 to generate data 353 that includes position and/or movement information regarding the object 380. In some implementations, a camera 370 is not used and data 353 is generated without image data 373 from camera 370. When object 380 is an eye 280, image data 373 is eye image data 373 and data 353 is eye data 353.

In the example illustration of FIG. 3, processing logic 350 is configured to activate light source 310 by way of communication channel X1. Activating light source 310 may include turning light source 310 on and/or modulating light source 310 with an electrical current or electrical voltage, for example. Processing logic 350 is also configured to adjust scanning module 330 by way of communication channel X2, in FIG. 3.

In operation, processing logic 350 may drive scanning module 330 to adjust scanning module 330 to move SMI sensor 340 so that light source 310 directs coherent light 390 to a first target location 381. When target 380 is an eye, first target location 381 may be a first eye box location and light source 310 may be an infrared source generating coherent infrared light. A portion of coherent light 390 is reflected and/or scattered by object 380 and enters optical cavity 316. Light sensor 360 generates first SMI signal 363 in response to first modulated coherent light 394. Image data 373 may be generated by camera 370 in an overlapping time period to when light source 310 illuminates first target location 381 with coherent light 390. Processing logic 350 generates first data 353 in response to first SMI signal 363 and first image data 373 where first SMI signal 363 and first image data 373 were captured during a first time period.

In a second time period subsequent to the first time period, processing logic 350 may drive scanning module 330 to adjust scanning module 330 to move SMI sensor 340 so that light source 310 directs coherent light 390 to a second target location 382. Light sensor 360 generates second SMI signal 363 in response to second modulated coherent light 394. Second image data 373 may be generated by camera 370 in an overlapping time period to when light source 310 illuminates second target location 382 with coherent light 390. Processing logic 350 generates second data 353 in response to second SMI signal 363 and second image data 373 where second SMI signal 363 and second image data 373 were captured during the second time period.

Thus, system 300 is configured to generate first target data 353 for a first time period to measure target location 381, generate second target data 353 for a second time period to measure target location 382, and continue to raster-scan scanning module 330 so that SMI sensor 340 generates SMI signals 363 for each target location (e.g. target location 383 and 384) of object 380. By scanning at a high scanning frequency (e.g. 1 kHz or more), accurate movement and/or position data of object 380 can be generated by measuring hundreds of target locations per second. In the context of eye-tracking, target locations 381, 382, 383, and 384 may be eyebox locations 381, 382, 383, and 384.

Figure 2B:
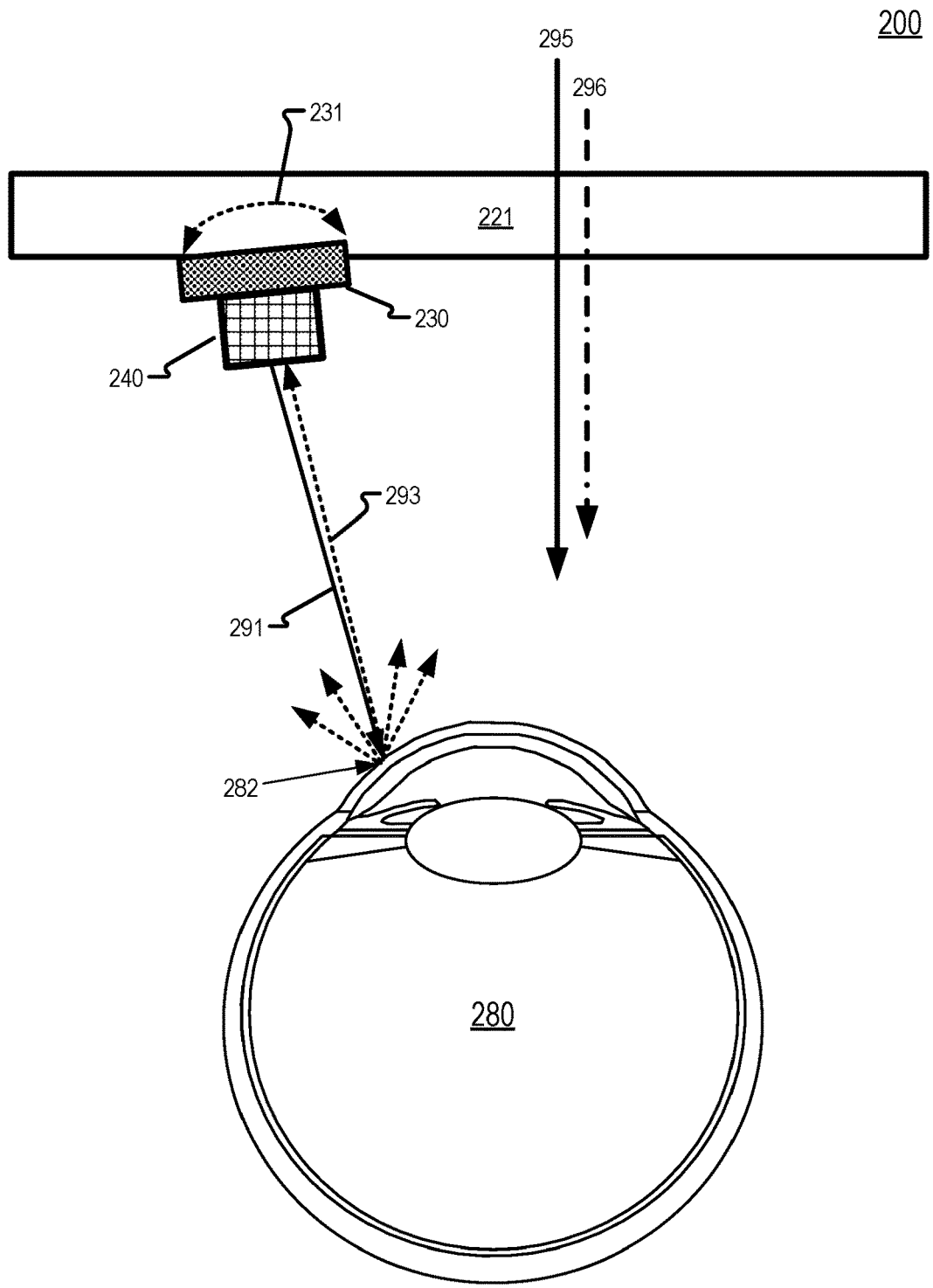

FIG. 2A illustrates that scanning module 230 may be adjusted to move SMI sensor 240 to direct coherent light 290 to eyebox location 281 to generate a first SMI signal of eyebox location 281 by measuring the feedback light 292 that is reflected and/or scattered from eyebox location 281. Feedback light 292 may propagate along an optical path that is considered the reverse optical path of coherent light 290 that becomes incident onto a given eyebox location. At a second time period, FIG. 2B illustrates that scanning module 230 may be adjusted to move SMI sensor 240 to direct coherent light 291 to eyebox location 282 to generate a second SMI signal of eyebox location 282 by measuring the feedback light 293 that is reflected and/or scattered from eyebox location 282. Of course, this process can be repeated to raster-scan scanning module 230 to a plurality of eyebox locations to measure feedback light (and generate a corresponding SMI signal 363) for each eyebox location.

Figure 4A:
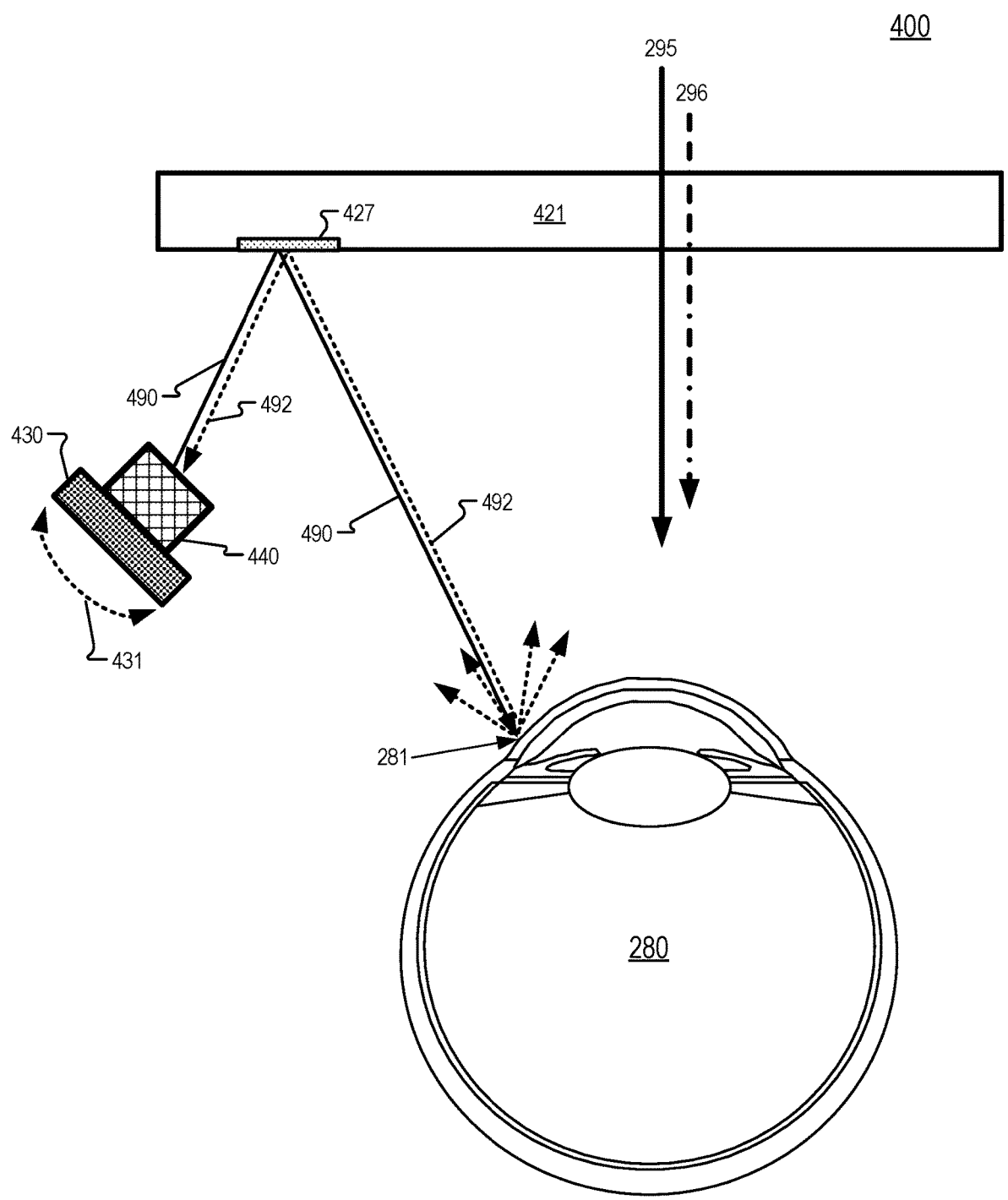
FIGS. 4A and 4B illustrate an SMI implementation including a scanning module configured to move an SMI sensor to direct coherent light to an eyebox location by way of a reflective element, in accordance with aspects of the disclosure.

FIG. 4A illustrates an SMI implementation 400 including a scanning module 430 configured to move an SMI sensor 440 to direct coherent light 490 to eyebox location 281 by way of reflective element 427, in accordance with aspects of the disclosure. SMI sensor 440 is coupled with scanning module 430 such that scanning module 430 moves SMI sensor 440 to direct coherent light 490 to different eyebox locations. SMI sensor 440 may include the features of SMI sensor 240 and/or 340. Scanning module 430 may be a one-dimensional (1D) or two-dimensional (2D) scanning module that is able to tip and/or tilt along one or more axes 431. Scanning module 430 may have the features of scanning module 230 and/or 330.

Reflective element 427 is configured to receive coherent light 490 from a light source of SMI sensor 440 and redirect the coherent light 490 to eyebox location 281. Reflective element 427 is also configured to receive feedback light 492 from eyebox location 281 and redirect the feedback light 492 to the optical cavity of the light source of SMI sensor 440 so that SMI sensor 440 can generate an SMI signal with respect to eyebox location 281. Feedback light 492 may propagate along an optical path that is considered the reverse optical path of coherent light 490 that becomes incident onto a given eyebox location.

SMI implementation 400 includes a transparent or semi-transparent optical element 421 that include reflective element 427. Reflective element 427 may be a mirror, semi-mirrored surface, holographic reflector, or diffractive grating tuned to reflect a wavelength of coherent light 490, for example. Optical element 421 may be included in lenses 121 of FIG. 1, for example. Optical element 421 may pass (transmit) scene light 295 from an environment of a user of a head mounted device 100 to eye 280. FIG. 4A also illustrates that in implementations where a head mounted device is also an HMD, optical element 421 may pass display light 296 to eye 280 to present images included in display light 296 to the eye 280 of a user of an HMD.

Figure 4B:
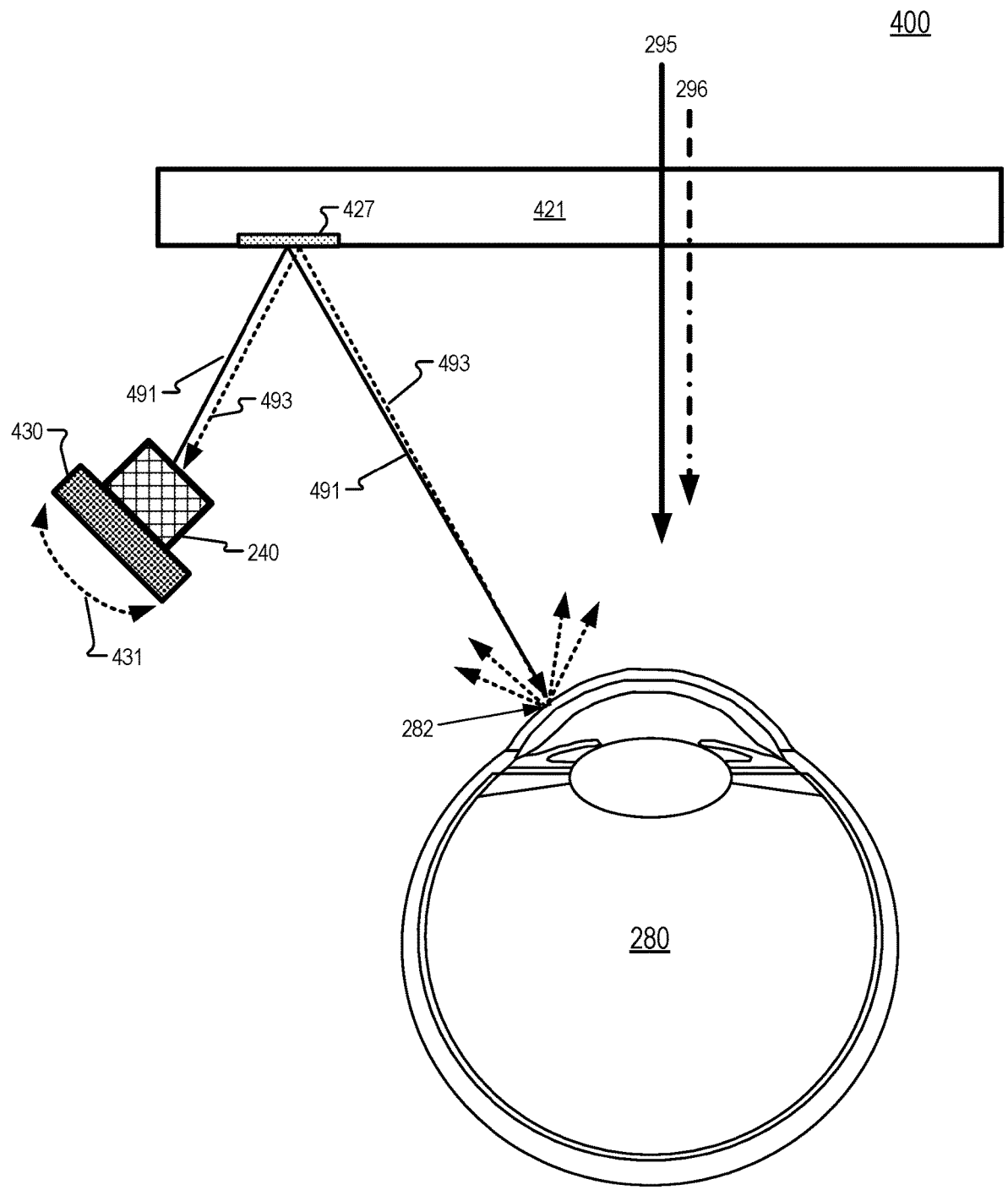

FIG. 4A illustrates that scanning module 430 may be adjusted to move SMI sensor 440 to direct coherent light 490 to reflect off of reflective element 427 to illuminate eyebox location 281 to generate a first SMI signal of eyebox location 281 by measuring the feedback light 492 that is reflected and/or scattered from eyebox location 281. At a second time period, FIG. 4B illustrates that scanning module 430 may be adjusted to move SMI sensor 440 to direct coherent light 491 to eyebox location 282 to generate a second SMI signal of eyebox location 282 by measuring the feedback light 493 that is reflected and/or scattered from eyebox location 282. Of course, SMI implementation 400 may be driven to continue to adjust scanning module 430 along one or more axes 431 to illuminate different eyebox locations of eye 280 to generate SMI signals corresponding to the different eyebox locations.

Figure 5A:
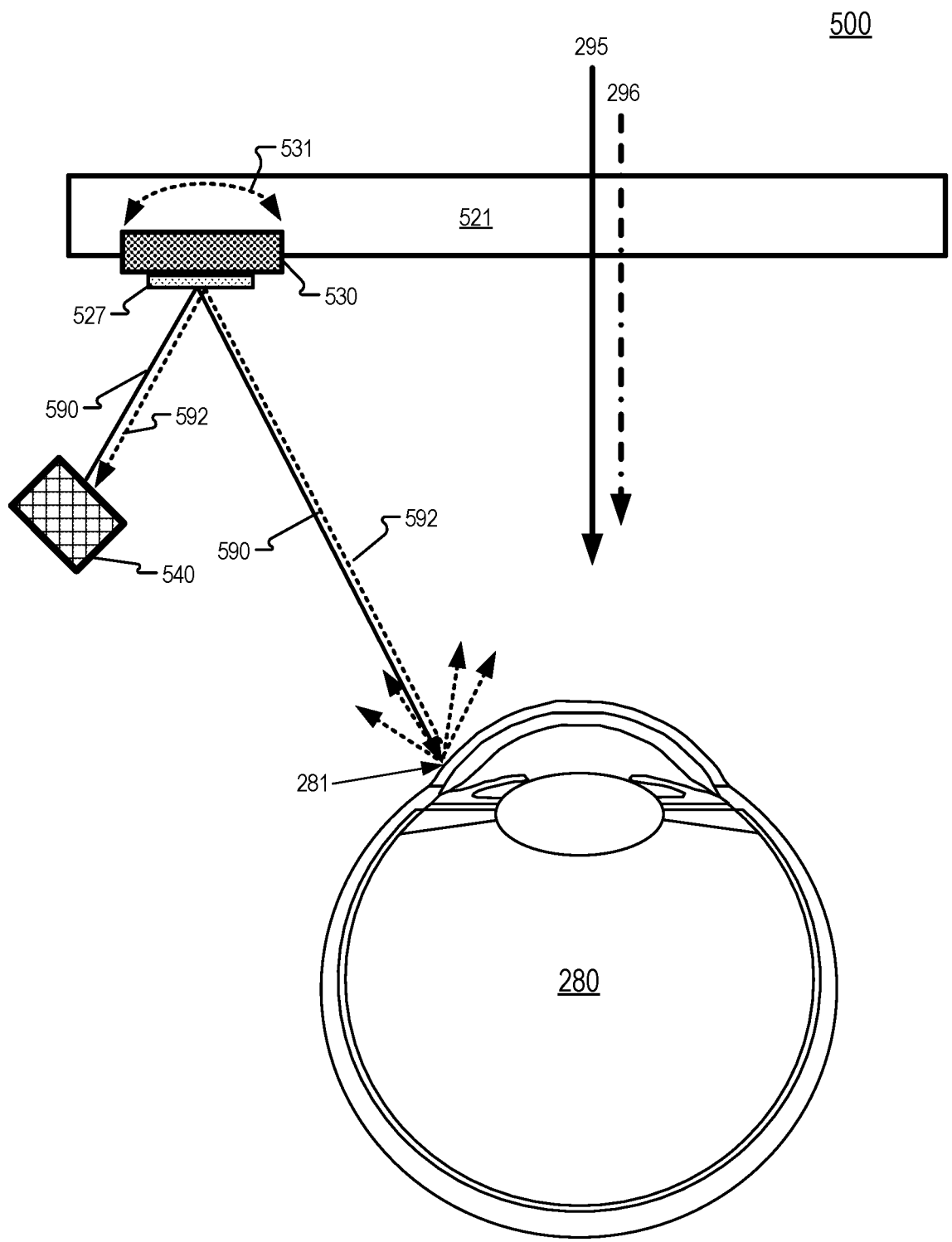
FIGS. 5A and 5B illustrate an SMI implementation having a scanning module that includes a reflective element to redirect coherent light received from an SMI sensor to an eyebox location, in accordance with aspects of the disclosure.
Figure 5B:
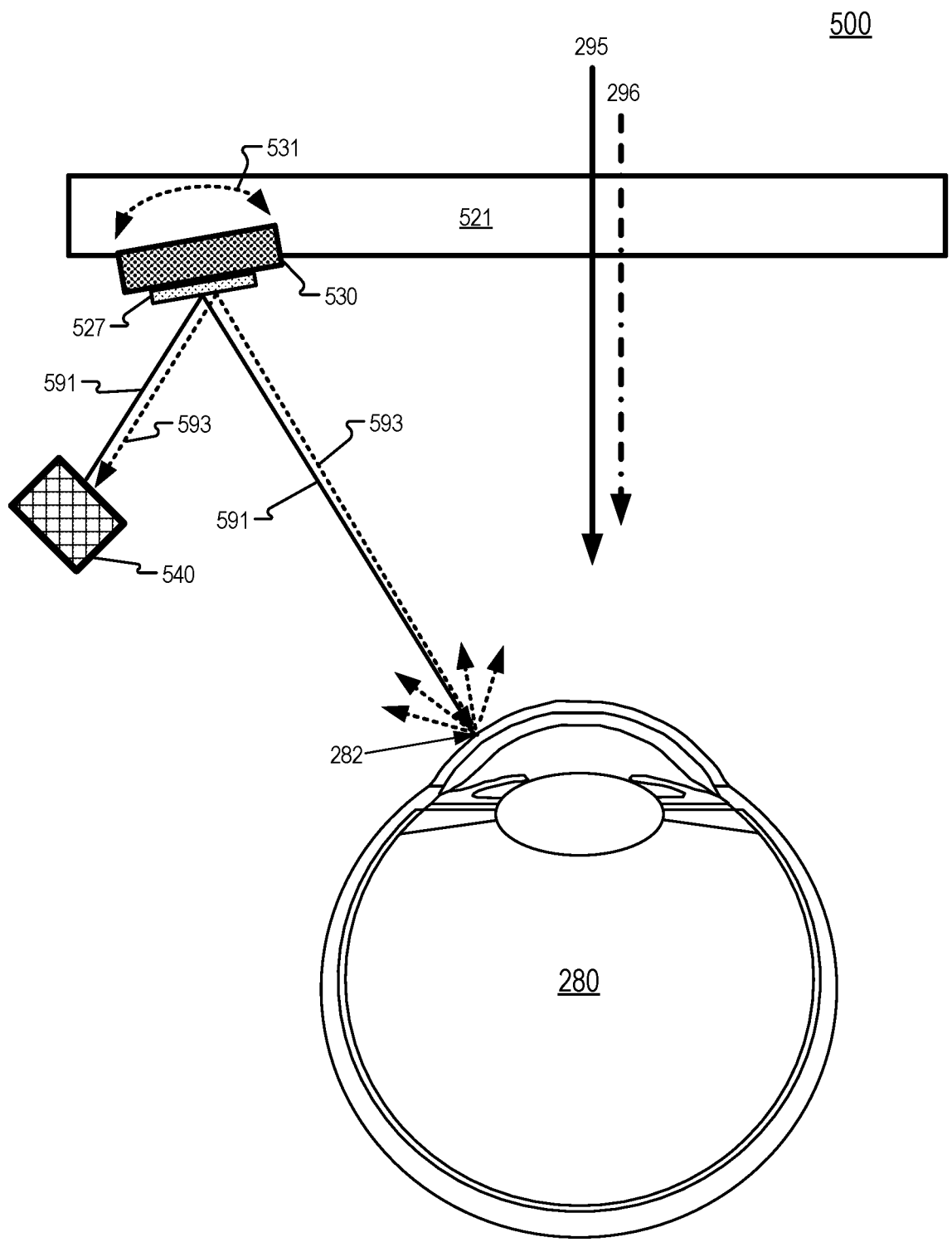

FIGS. 5A and 5B illustrate an SMI implementation 500 having a scanning module 530 that includes a reflective element 527 to redirect coherent light 590 received from SMI sensor 540 to an eyebox location, in accordance with aspects of the disclosure. In SMI implementation 500, SMI sensor 540 is stationary and the reflective element 527 of scanning module 530 provides the scanning functionality. Consequently, SMI sensor 540 is configured to point coherent light 590 to reflective element 527 and scanning module 530 is configured to direct coherent light 590 to eyebox location 281 by adjusting reflective element 527 to direct coherent light 590 emitted by the light source of SMI sensor 540 to eyebox location 281. Of course, scanning module 530 can direct coherent light 590 to different eyebox locations when scanning module 530 is adjusted along one or more axes 531. SMI sensor 540 may include the features of SMI sensor 240 and/or 340. Scanning module 530 may be a one-dimensional (1D) or two-dimensional (2D) scanning module that is able to tip and/or tilt along one or more axes 531. Scanning module 530 may include the features of scanning module 230. Scanning module 530 may be coupled with optical element 521.

Scanning module 530 is configured to move reflective element 527 to receive coherent light 590 from a light sensor of SMI sensor 540 and redirect the coherent light 590 to eyebox location 281. By doing this, reflective element 527 is also positioned to receive feedback light 592 from eyebox location 281 and redirect the feedback light 592 to the optical cavity of the light source of SMI sensor 540 so that SMI sensor 540 can generate an SMI signal with respect to eyebox location 281. Feedback light 592 may propagate along an optical path that is considered the reverse optical path of coherent light 590 that becomes incident onto a given eyebox location.

Reflective element 527 may be a mirror, semi-mirrored surface, holographic reflector, deformable mirror, or diffractive grating tuned to reflect a wavelength of coherent light 590, for example. Optical element 521 may be included in lenses 121 of FIG. 1, for example. Optical element 521 may pass (transmit) scene light 295 from an environment of a user of a head mounted device 100 to eye 280. FIG. 5A also illustrates that in implementations where a head mounted device is also an HMD, optical element 521 may pass display light 296 to eye 280 to present images included in display light 296 to the eye 280 of a user of an HMD.

FIG. 5A illustrates that scanning module 530 may be adjusted to move reflective element 527 to redirect coherent light 590 to reflect off of reflective element 527 to illuminate eyebox location 281 to generate a first SMI signal of eyebox location 281 by measuring the feedback light 592 that is reflected and/or scattered from eyebox location 281. The first SMI signal is generated by a light sensor (e.g. light sensor 360) of the SMI sensor 540. At a second time period, FIG. 5B illustrates that scanning module 530 may be adjusted to move reflective element 527 to redirect coherent light 591 to eyebox location 282 to generate a second SMI signal of eyebox location 282 by measuring the feedback light 593 that is reflected and/or scattered from eyebox location 282. The second SMI signal is generated by the light sensor of the SMI sensor 540. Of course, SMI implementation 500 may be driven to continue to adjust scanning module 530 along one or more axes 531 to illuminate different eyebox locations of eye 280 to generate SMI signals corresponding to the different eyebox locations.

Figure 6A:
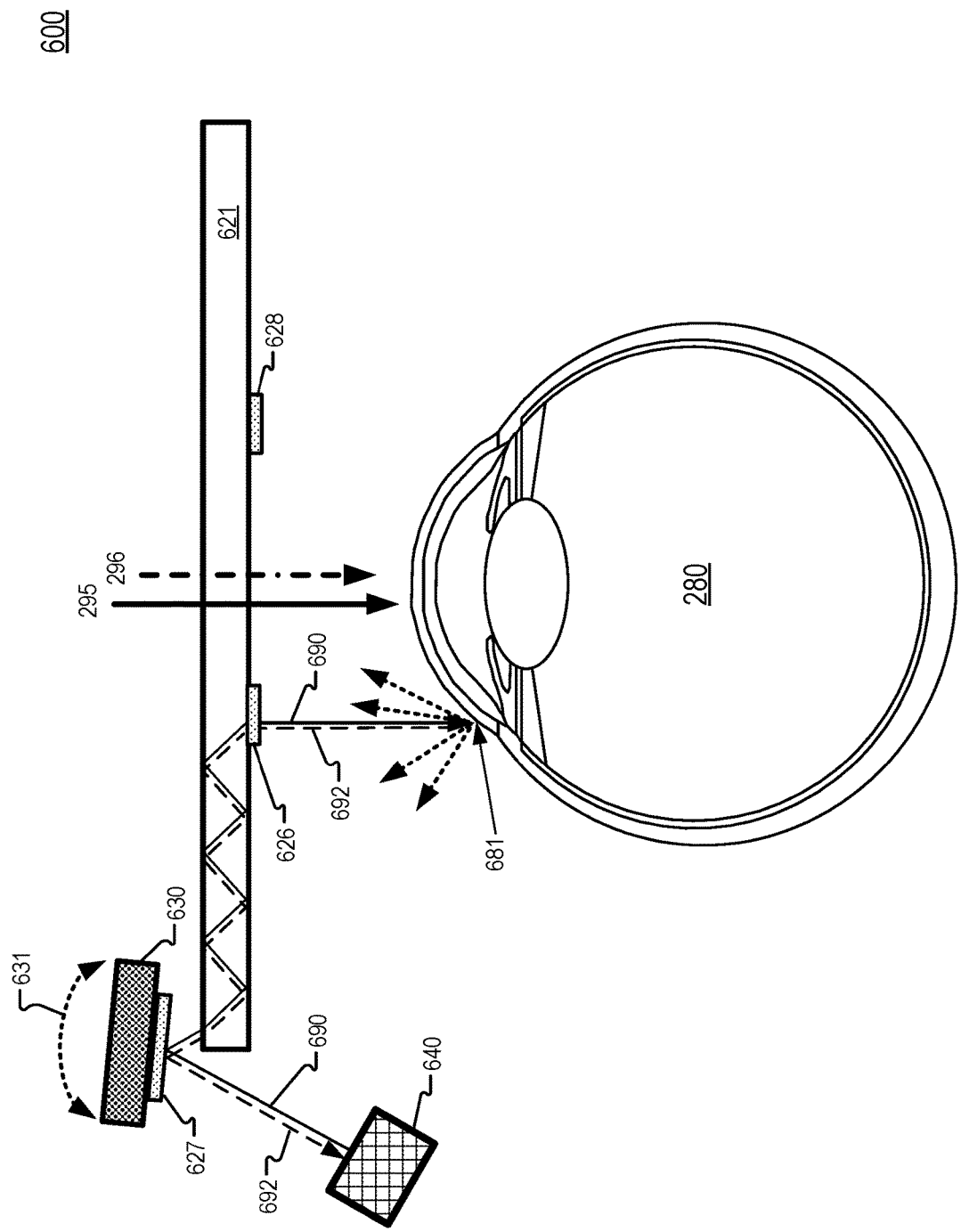
FIGS. 6A and 6B illustrate an SMI implementation having a scanning module that includes a reflective element to redirect coherent light received from an SMI sensor to different eyebox locations via a waveguide, in accordance with aspects of the disclosure.
Figure 6B:
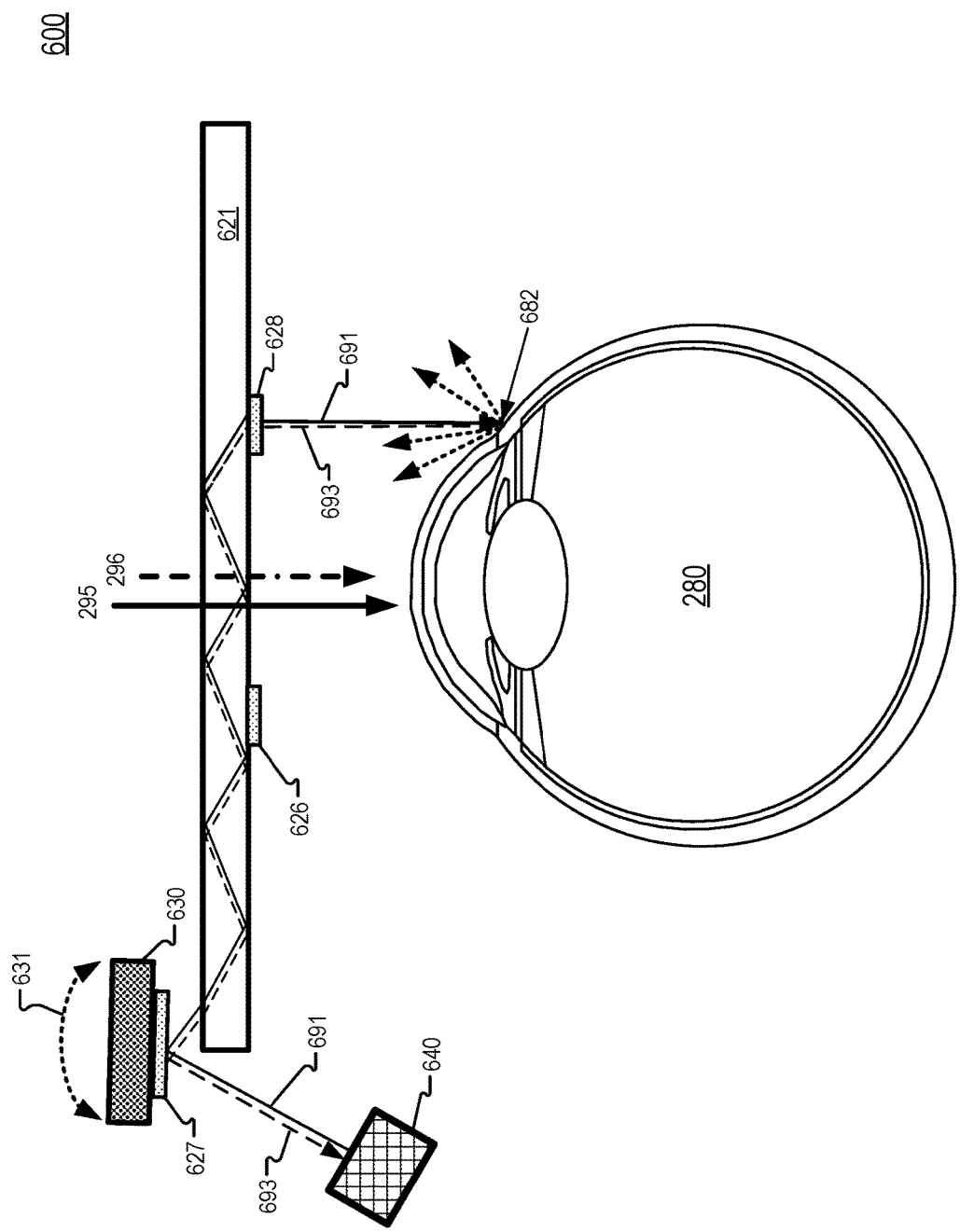

FIGS. 6A and 6B illustrate an SMI implementation 600 having a scanning module 630 that includes a reflective element 627 to redirect coherent light 690 received from SMI sensor 640 to different eyebox locations via a waveguide 621, in accordance with aspects of the disclosure. In SMI implementation 600, SMI sensor 640 is stationary and reflective element 627 of scanning module 630 provides the scanning functionality. Consequently, SMI sensor 640 is configured to point coherent light 690 to reflective element 627 and scanning module 630 is configured to direct coherent light 690 to eyebox location 681 by adjusting reflective element 627 to direct coherent light 690 emitted by the light source of SMI sensor 640 to a first output grating 626 of waveguide 621. First output grating 626 directs the coherent light 690 to first eyebox location 681. In the illustrated implementation of FIG. 6A, waveguide 621 confines coherent light 690 within waveguide 621 until output grating 626 outcouples coherent light 690 toward eyebox location 681. Waveguide 621 may confine coherent light 690 within waveguide 621 using total internal reflection (TIR) or using mirrored or partially mirrored surfaces, for example. Waveguide 621 may include a transparent refractive material that coherent light 690 propagates through. Waveguide 621 may include a transparent refractive material having a refractive index that is higher than surround mediums to facilitate TIR. Coherent light 690 and feedback light 692 may reflect off of boundaries of waveguide 621 while propagating in waveguide 621, as illustrated in FIGS. 6A and 6B.

SMI sensor 640 may include the features of SMI sensor 240 and/or 340. SMI sensor 640 may be out-of-field of a FOV of a user of a head mounted device that incorporates SMI implementation 600. Scanning module 630 may be a one-dimensional (1D) or two-dimensional (2D) scanning module that is able to tip and/or tilt along one or more axes 631. Scanning module 630 may include the features of scanning module 230. Scanning module 630 may also be out-of-field of a FOV of a user of a head mounted device that incorporates SMI implementation 600.

Reflective element 627 may be a mirror, semi-mirrored surface, or diffractive grating tuned to reflect a wavelength of coherent light 690, for example. Waveguide 621 may be included in lenses 121 of FIG. 1, for example. Waveguide 621 may pass (transmit) scene light 295 from an environment of a user of a head mounted device 100 to eye 280. FIG. 6A also illustrates that in implementations where a head mounted device is also an HMD, waveguide 621 may pass display light 296 to eye 280 to present images included in display light 296 to the eye 280 of a user of an HMD.

Scanning module 630 is configured to move reflective element 627 to receive coherent light 690 from a light sensor of SMI sensor 640 and redirect the coherent light 690 to eyebox location 681 via output grating 626. By doing this, reflective element 627 is also positioned to receive feedback light 692 from eyebox location 681 and redirect the feedback light 692 to the optical cavity of the light source of SMI sensor 640 so that SMI sensor 640 can generate an SMI signal with respect to eyebox location 681. Feedback light 692 may propagate along an optical path that is considered the reverse optical path of coherent light 690 that becomes incident onto a given eyebox location. Thus, feedback light 692 may propagate through first output grating 626, propagate through waveguide 621, reflect off of reflective element 627, and then enter the optical cavity of a light source of SMI sensor 640, in that order.

FIG. 6A illustrates that scanning module 630 may be adjusted (during a first time period) to move reflective element 627 to redirect coherent light 690 to first output grating 626 of waveguide 621 to illuminate eyebox location 681 to generate a first SMI signal of eyebox location 681 by measuring the feedback light 692 that is reflected and/or scattered from eyebox location 681. The first SMI signal is generated by a light sensor (e.g. light sensor 360) of the SMI sensor 640. At a second time period, FIG. 6B illustrates that scanning module 630 may be adjusted to move reflective element 627 to redirect coherent light 691 to second output grating 628 of waveguide 621 to illuminate eyebox location 682 to generate a second SMI signal of eyebox location 682 by measuring the feedback light 693 that is reflected and/or scattered from eyebox location 682. The second SMI signal is generated by the light sensor of the SMI sensor 640. While example waveguide 621 is illustrated with only two example output gratings, those skilled in the art appreciate that many different output gratings could be included in waveguide 621 where each different output grating corresponded to directing coherent light to a different eyebox location. Thus, scanning module 630 can be adjusted along one or more axes 631 to direct coherent light from a light sensor of SMI sensor 640 to a plurality of eyebox locations by directing the coherent light to a particular output grating among a plurality of output gratings. This will generate a plurality of SMI signals corresponding to the different eyebox locations. The plurality of SMI signals can be used to determine position and/or movement information of an eye.

Figure 7:
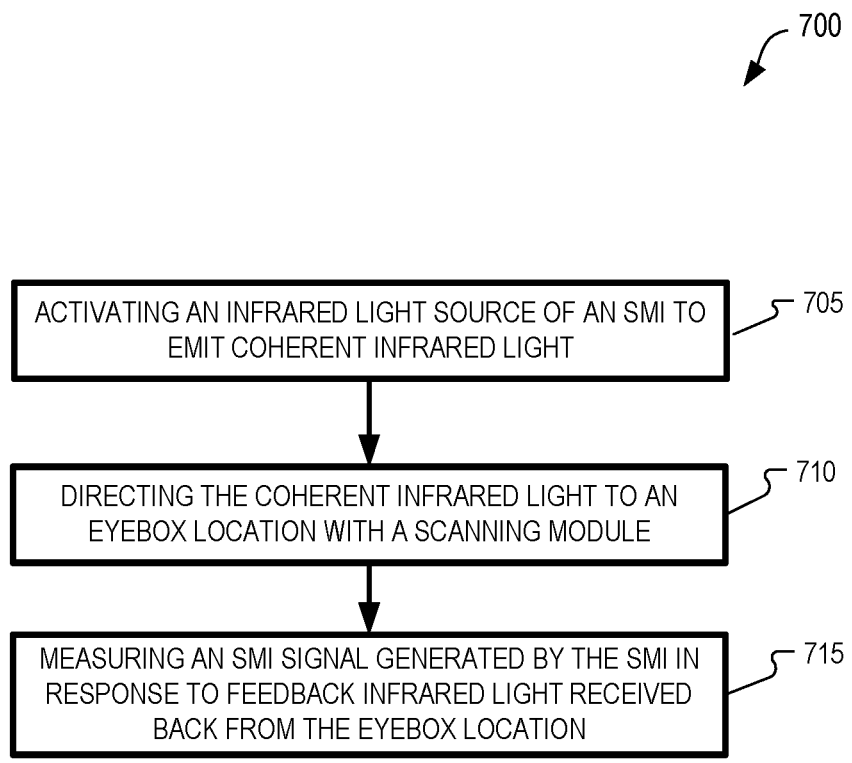
FIG. 7 illustrates an example SMI eye-tracking process, in accordance with aspects of the disclosure.

FIG. 7 illustrates an example SMI eye-tracking process 700, in accordance with aspects of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. In some implementations processing logic (e.g. processing logic 350) may execute some or all of the process blocks of eye-tracking process 700.

In process block 705, an infrared light source of a self-mixed interferometer (SMI) is activated to emit coherent infrared light. For example, light source 310 of SMI sensor 340 may be an infrared light source that emits coherent infrared light 390. Processing logic 350 may activate an infrared light source by driving an activation signal onto communication channel X1, for example. Processing logic 350 may be incorporated into any of the SMI implementations 200, 400, 500, or 600.

In process block 710, the coherent infrared light is directed to an eyebox location (e.g. eyebox location 281) with a scanning module (e.g. scanning module 230, 330, 430, 530, or 630).

In process block 715, an SMI signal is measured. The SMI signal (e.g. SMI signal 363) generated by the SMI (e.g. SMI sensor 340) in response to feedback infrared light (e.g. feedback light 392) received back from the eyebox location. The feedback infrared light is a portion of the coherent infrared light.

In an implementation of process 700, the SMI is coupled with the scanning module and directing the coherent infrared light to the eyebox location with the scanning module includes adjusting the scanning module to move the SMI to direct the coherent infrared light of the SMI to the eyebox location.

In some implementations, the scanning module includes a reflective element and the SMI is configured to point the coherent infrared light to the reflective element. Directing the coherent infrared light to the eyebox location with the scanning module may include adjusting the reflective element to redirect the coherent infrared light of the SMI to the eyebox location.

Directing the coherent infrared light to the eyebox location with the scanning module may include directing the coherent infrared light to a particular output grating of a near-eye waveguide. For example, SMI implementation 600 includes a near-eye waveguide 621 including output gratings 626 and 628.

Implementations of the disclosure are discussed in the context of detecting depth and/or velocity measurements of an object (e.g. object 380) and the particular context of detecting depth and/or velocity measurements of eye 280. Those skilled in the art appreciate that SMI techniques described with respect to object 380 may be utilized with respect to sensing eye 280 and that SMI techniques described with respect to sensing eye 280 may be applied more generally to sensing other objects. Furthermore, while not specifically illustrated, SMI implementations 100, 200, 400, 500, and 600 may include processing logic (e.g. processing logic 350) and an optional camera (e.g. camera 370) to execute the scanning and measuring functions described with respect to the different implementations. The processing logic may be included in a head mounted device (e.g. head mounted device 100) to implement SMI eye-tracking techniques in a head mounted device. It is further appreciated that implementation of the disclosure that describe infrared light sources emitting infrared light sources may be near-infrared light sources emitting near-infrared light. Some of the light sources described in this disclosure may emit coherent near-infrared light centered around 850 nm or 940 nm, for example.

Embodiments of the invention may include or be implemented in conjunction with an artificial reality system. Artificial reality is a form of reality that has been adjusted in some manner before presentation to a user, which may include, e.g. a virtual reality (VR), an augmented reality (AR), a mixed reality (MR), a hybrid reality, or some combination and/or derivatives thereof. Artificial reality content may include completely generated content or generated content combined with captured (e.g. real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g. create content in an artificial reality and/or are otherwise used in (e.g. perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 350) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels (e.g. communication channels X1 and X2) may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g. computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g. a computer, network device, personal digital assistant, manufacturing tool, any device with a set of one or more processors, etc.). For example, a machine-readable storage medium includes recordable/non-recordable media (e.g. read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eye-tracking device comprising:
a self-mixed interferometer (SMI) including:
an infrared light source including an optical cavity configured to emit coherent infrared light; and
a light sensor optically coupled with the infrared light source; and
a scanning module configured to direct the coherent infrared light to an eyebox location, wherein the light sensor of the SMI is configured to generate an SMI signal in response to feedback light entering the optical cavity of the infrared light source, the feedback light being a portion of the coherent infrared light received back from the eyebox location,
wherein the SMI is coupled with the scanning module, and wherein the scanning module is configured to direct the coherent infrared light to the eyebox location by adjusting the scanning module to move the SMI to direct the coherent infrared light emitted by the infrared light source of the SMI to the eyebox location.

2. The eye-tracking device of claim 1 further comprising:
a reflective element configured to receive the coherent infrared light from the light sensor of the SMI and redirect the coherent infrared light to the eyebox location, wherein the reflective element is also configured to receive the feedback light from the eyebox location and redirect the feedback light to the optical cavity of the infrared light source.

3. The eye-tracking device of claim 1, wherein the scanning module is configured to direct the coherent infrared light to a second eyebox location during a second time period that is a subsequent to a first time period that the scanning module directs the coherent infrared light to the eyebox location.

4. The eye-tracking device of claim 1 further comprising:
a transparent optical element passing visible light to the eyebox location, wherein the scanning module is coupled with the transparent optical element.

5. The eye-tracking device of claim 1, wherein the scanning module is configured to direct the coherent infrared light to 120 or more eyebox locations per second.

6. The eye-tracking device of claim 1 further comprising:
processing logic configured to receive the SMI signal from the light sensor, wherein the processing logic is further configured to generate eye data that includes depth or velocity measurements of an eye when an eye is present in an eyebox.

7. The eye-tracking device of claim 6, wherein the processing logic is configured to receive eye image data from a camera positioned to image the eye, and wherein the eye data generated by the processing logic is generated in response to the SMI signal and the eye image data.

8. The eye-tracking device of claim 1, wherein the scanning module is configured to direct the coherent infrared light to a second eyebox location, wherein the light sensor of the SMI is configured to generate a second SMI signal in response to second feedback light entering the optical cavity of the infrared light source, the second feedback light being a portion of the coherent infrared light received back from the second eyebox location.

9. A sensor comprising:
a self-mixed interferometer (SMI) including a light source configured to emit coherent light; and
a scanning module configured to direct the coherent light to a plurality of target locations,
wherein the SMI also includes a light sensor configured to generate a plurality of SMI signals in response to feedback light received back from the plurality of target locations, and wherein the SMI is coupled with the scanning module, and wherein the scanning module is configured to direct the coherent light to the target locations by adjusting the scanning module to move the SMI to direct the coherent light emitted by the light source of the SMI to the target locations.

10. A method of eye-tracking comprising:
activating an infrared light source of a self-mixed interferometer (SMI) to emit coherent infrared light;
directing the coherent infrared light to an eyebox location with a scanning module; and
measuring an SMI signal generated by the SMI in response to feedback infrared light received back from the eyebox location, wherein the feedback infrared light is a portion of the coherent infrared light, and wherein the SMI is coupled with the scanning module, and wherein directing the coherent infrared light to the eyebox location with the scanning module includes adjusting the scanning module to move the SMI to direct the coherent infrared light of the SMI to the eyebox location.

11. The sensor of claim 9, wherein the scanning module is configured to direct the coherent light to a second eyebox location, wherein the light sensor of the SMI is configured to generate a second SMI signal in response to second feedback light entering the optical cavity of the light source, the second feedback light being a portion of the coherent light received back from the second eyebox location.

12. The sensor of claim 9 further comprising:

processing logic configured to receive the SMI signal from the light sensor, wherein the processing logic is further configured to generate eye data that includes depth or velocity measurements of an eye when an eye is present in an eyebox.

13. The sensor of claim 12, wherein the processing logic is configured to receive eye image data from a camera positioned to image the eye, and wherein the eye data generated by the processing logic is generated in response to the SMI signal and the eye image data.

14. The sensor of claim 9, wherein the scanning module is configured to direct the coherent light to a second eyebox location during a second time period that is a subsequent to a first time period that the scanning module directs the coherent light to the eyebox location.

15. The sensor of claim 9 further comprising:

a transparent optical element passing visible light to the eyebox location, wherein the scanning module is coupled with the transparent optical element.

16. The sensor of claim 9, wherein the scanning module is configured to direct the coherent light to 120 or more eyebox locations per second.

* * * * *